United States Patent [19]

Stufflebam et al.

[11] 4,409,845
[45] Oct. 18, 1983

[54] CALIBRATING BAG FOR USE ON DISPENSER NOZZLES

[76] Inventors: Charles J. Stufflebam, 214 Redwood Ct., Lee's Summit, 64023; Spencer D. Hamer, 10220 Locust, Kansas City, both of Mo. 64131

[21] Appl. No.: 259,464

[22] Filed: May 1, 1981

[51] Int. Cl.³ .......................... G01F 1/00; G01F 9/00
[52] U.S. Cl. ........................................ 73/861; 73/168; 73/427
[58] Field of Search .................... 73/168, 215, 223, 3, 73/861, 427, 428

[56] References Cited

U.S. PATENT DOCUMENTS

| | | | |
|---|---|---|---|
| 2,062,173 | 11/1936 | Haskins | 73/168 |
| 2,165,705 | 7/1939 | Houser | 73/215 |
| 2,281,512 | 4/1942 | Reed | 73/215 |
| 2,767,581 | 10/1956 | Moorehead | 73/215 |
| 3,129,844 | 4/1964 | Madison | 73/427 |
| 3,859,854 | 1/1975 | Dye | 73/215 |
| 3,888,234 | 6/1975 | Marx | 73/427 |
| 4,085,616 | 4/1978 | Patel et al. | 73/215 |
| 4,213,336 | 7/1980 | Schweickart et al. | 73/215 |
| 4,357,670 | 11/1982 | McFarlane | 73/861 |

*Primary Examiner*—Herbert Goldstein
*Attorney, Agent, or Firm*—Litman, Day & McMahon

[57] ABSTRACT

A calibrating device for agricultural sprayers utilizes an elongate, flexible throw-away bag of plastic sheet material having a top portion adapted for attaching to an agricultural sprayer boom and an open interior cavity for collecting the spray from a sprayer dispenser nozzle. A facing wall of the bag has a plurality of indicia thereon to measure the rate of spray for calibration of the nozzles to a correct application setting. The indicia include transverse marks indicating quantity, such as gallons, and longitudinal lines indicating rate.

2 Claims, 5 Drawing Figures

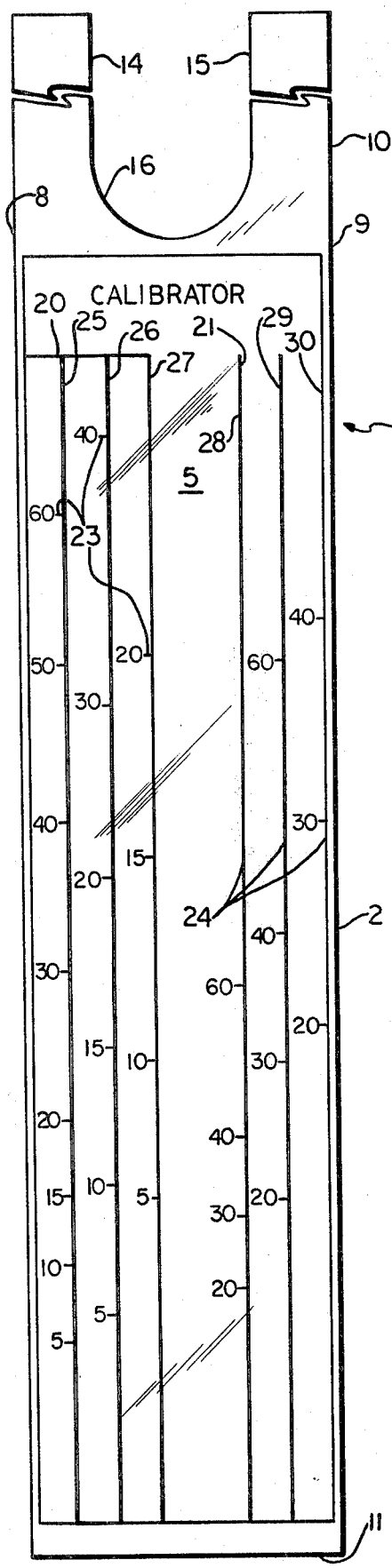
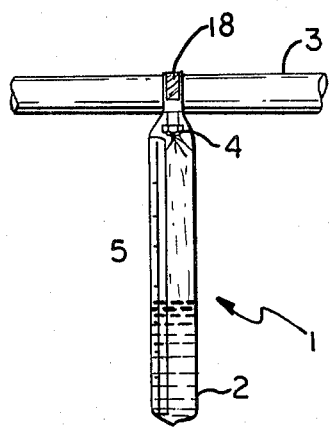
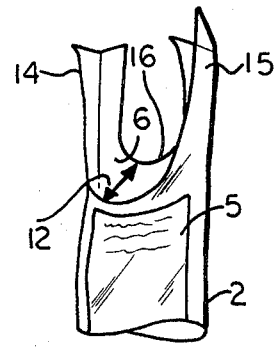
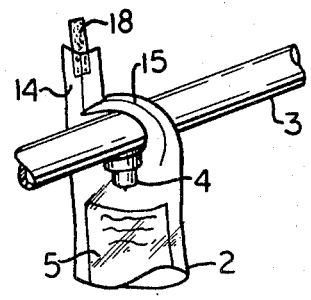
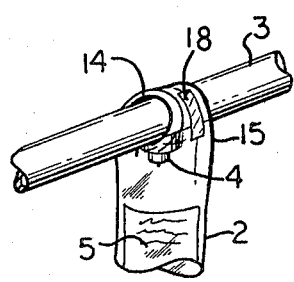

CALIBRATING BAG FOR USE ON DISPENSER NOZZLES

BACKGROUND OF THE INVENTION

The present invention relates to a rate of flow measuring device and particularly to such a device adapted for use on agricultural sprayers.

The necessity for effective control and elimination of weeds and undesirable plants from crops and control of insects and plant diseases is well known. Agricultural chemicals are becoming increasingly expensive and waste of expensive chemicals must be carefully avoided. Preferably, the proper amount must be applied, for too small an application of spray material fails to produce the desired effect and over application wastes material as well as causing "hot spots" which may burn or otherwise harm the crop plant.

Recent studies have indicated that two of every three pesticide applicators were making significant application errors as a result of inaccurate calibration, incorrect mixing, worn equipment and failure to properly read product labels. These mistakes are costly in added chemical expense, potential crop damage and threatened weed competition. The application of spray material is figured in an amount of gallons of solution sprayed per acre according to a specified concentration of chemical material per gallon of water. Spray nozzles are accordingly calibrated in gallons per acre and are generally standardized for mounting along a boom at 20 inch intervals with the sprayer calculated to move at rates between 3 and 8 miles per hour. Tests show that spray nozzles are often worn, plugged with foreign matter or of the wrong type for the application. Such nozzles fail to broadcast the proper amount of chemical evenly, at a steady rate, and in the amount required for proper application.

In order to counter the above difficulties, calibration procedures and tools have been applied such as graduated jars, stop watches, scales, tape measure, quantity gauges, pocket calculators and various and sundry other items. Confronted with the myriad tools required to do a simple job, the farmer quickly becomes exasperated by all the steps and procedures required and continues to misapply the chemical material.

OBJECTS OF THE INVENTION

In view of the above, the objects of the present invention are: to provide an easily used device for determining the rate of flow from a sprayer nozzle; to provide such a device which is inexpensively constructed and intended for one-time, throw-away use; to provide such a device which provides a wide range of calibration measurements for variation in application amount and rate of an application; and to provide such a calibrating apparatus which is relatively inexpensive, sturdy and efficient in use and particularly well adapted for the intended purpose.

Other objects and advantages of this invention will become apparent from the following description taken in connection with the accompanying drawings wherein are set forth by way of illustration and example, a certain embodiment of this invention.

DESCRIPTION OF THE DRAWINGS

FIG. 1 is a fragmentary, side elevational view of a calibrating device embodying the present invention and shown in connection with a portion of a sprayer boom assembly.

FIG. 2 is a fragmentary, side elevational view of the top of the calibrating device.

FIG. 3 is a fragmentary, perspective view of a portion of the calibrating device being attached to the sprayer boom structure.

FIG. 4 is a fragmentary, perspective view of the calibrating device attached to the sprayer boom structure.

FIG. 5 is an enlarged, elevational view of the calibrating device.

DESCRIPTION OF THE PREFERRED EMBODIMENT

As required, a detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIGS. 1 and 5 generally indicates a calibrating device embodying the present invention. The calibrating device 1 includes an elongate bag 2 of transluscent or transparent material for attachment to a sprayer boom structure 3 to catch and retain liquid spray material dispensed from a spray nozzle 4. The bag 2 has a front facing wall 5 with a plurality of calibration indicia thereon to measure the quantity of liquid spray material received in the bag. The calibration indicia include first indicia corresponding to a rate of discharge from the spray nozzle 4.

The sprayer boom structure 3 comprises a portion of an agricultural sprayer device, such as of a type having outwardly extending booms to broadcast or spread the spray material. The boom structure 3 may have load bearing conduits which carry the spray material or have flexible hoses extending along a rigid boom structure to support same. The calibrating device 1 is designed for attachment either to rigid boom conduit or to flexible sprayer line for use with the particular sprayer implement. In either mounting construction, the nozzle 4 dispenses spray material such as insecticide, fungicide or herbicide. The spray material may be an aqueous solution or a suspension of fine or granulated material with the water of a sprayer tank. Such sprayer nozzles may be worn or otherwise malfunctioning with the effect that the nozzle either over or under dispenses spray material during use.

In the illustrated example, the elongate bag 2 is a flexible bag of plastic sheet material having a thickness in the range of 2 to 10 mils, and particularly 3 mils. Several types of plastic sheet material may be used and in the illustrated example, the bag is of polyethelene with PVC added as a strengthening agent to make the bag walls fluid tight. Preferably, the plastic material is transparent or transluscent to permit visual determination of the level of liquid received in the bag. As used herein, the term "transluscent" also contemplates the term "transparent".

The bag has a front facing wall 5, a rear wall 6, FIGS. 2 and 5, opposite side edges 8 and 9 and top and bottom portions 10 and 11. The walls 5 and 6 are joined together at the bottom portion 1 and along the side edges 8 and 9 to provide an open interior cavity 12 for receiving a quantity of liquid spray material. In the illustrated example, the bag is manufactured of a single elongate strip of plastic sheet material, folded medially to provide the bottom portion 11 and heat sealed along the side edges 8 and 9 to form the cavity 12.

The top portion 10 includes means for attachment to a sprayer boom structure and, in the illustrated example, includes spaced arm portions 14 and 15 extending upwardly along side edges 8 and 9 and providing an opening 16, such as U-shaped, for receiving the sprayer boom structure 3 between the arm portions 14 and 15.

The arm portions 14 and 15 are fastened or wrapped about the sprayer boom structure 3 to suspend the bag 2 therefrom and, in the illustrated example, a piece of adhesive surfaced tape 18, FIGS. 1, 3 and 4, is attached to the arm portion 14 whereby and about the sprayer boom structure 3, the arm portion 14 is pulled downwardly atop the arm portion 15 and the tape 18 pressed into adhesive contact.

The front facing wall has a plurality of calibration indicia thereon to measure the quantity of liquid spray material received in the cavity 12. The calibration indicia include one indicia group 20 adjacent the side edge 8 including a first given time test period, such as 30 seconds, and a second indicia group 21 adjacent the side edge 9 and indicating a second given time test period, such as 15 seconds. Each indicia group 20 and 21 has first indicia 23 including marks transverse to the longitudinal axis of the bag 2 for indicating a quantity of liquid spray material in the bag 2. Each group 20 and 21 also has a plurality of second indicia 24 of longitudinal lines corresponding to a rate of flow from the nozzle 4. As the nozzle 4 is typically calibrated or identified in terms of spray material discharged per unit of time, the first and second indicia 23 and 24 together provide the information necessary to the applicator or farmer in order to determine the accuracy of the nozzle.

In the illustrated example, the first indicia group 20 is for measurement of a broadcast rate between 5 and 20 gallons per acre calibrated by operating the sprayer for 30 seconds. The second indicia group 21 is for calibration of 20 to 60 gallons per acre through operation of the sprayer for 15 seconds. In the first indicia group 20, longitudinal line 25 is to be used when the sprayer is moved forwardly at 3 miles per hour, line 26 at 5 miles per hour and line 27 at 8 miles per hour. The same forward speeds are used in respect to the second indicia group 21 wherein line 28 corresponds to 3 miles per hour, line 29 to 5 miles per hour and line 30 to 8 miles per hour. Each of the first indicia 23 providing the lines 25 through 30, includes volume measurement indicia such as gallon ticks or marks and arranged between 5 to 60 gallons as illustrated.

In the use of the calibration device, the bag 2 is fitted over each nozzle 4 to be checked and suspended therefrom by attachment of the arm portions 14 and 15. The sprayer pump is set to the pressure to be used during spraying. The sprayers then are operated for 30 seconds or 15 seconds. If more than 20 gallons of spray material per acre is to be broadcast, the sprayer is operated for 15 seconds. If less than 20 gallons per acre is to be broadcast, the sprayer is operated for 30 seconds. After expiration of the time, the sprayer is shut off and the indicia scale consulted along the second indicia 24 to determine the gallons per acre delivered by each nozzle at a field speed of 3.5 or 8 miles per hour.

If some of the nozzles are crudely malfunctioning, excessively worn, plugged or stopped, the strainers and nozzles should be replaced or cleaned as necessary. All of the nozzles should be checked to determine that they have the same size orifice. After all the nozzles have been checked for uniform output of gallons per acre, to obtain a desired measurement of gallons per acre, sprayer air pressure may be adjusted by increasing the sprayer pressure if the liquid spray material contained in the bag 2 is below the desired gallons per acre mark and decreased if above the desired gallons per acre mark.

After calibration of the sprayer, the calibrating device 1 may be discarded or reused as necessary. The inexpensive construction and plastic sheet material of the bag 2 enables throw-away and one time usage.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A calibration device for determining the nozzle output of agricultural sprayers comprising:
   (a) an elongate, flexible, throw-away bag of translucent plastic sheet material having a thickness in the range of 2 to 5 mils;
   (b) said bag having front and rear walls, opposite side edges and top and bottom portions, said walls being joined together at said bottom portion and along said side edges to provide an open interior cavity for receiving a quantity of liquid spray material dispensed from said nozzle;
   (c) said top portion including spaced arm portions extending upwardly along said side edges and providing a U-shaped opening for fastening about a spray boom and suspending said bag therefrom;
   (d) said front wall having a plurality of indicia thereon to measure the quantity of liquid spray material dispensed into said bag and including horizontal indicia corresponding to a liquid quantity measurement and longitudinal indicia corresponding to the speed of travel of the applicator vehicle whereby a level of liquid quantity corresponds to a combined indicia disclosing a total quantity of liquid spray material as dispensed during a specific time period;
   (e) said bag includes one group of horizontal and longitudinal indicia adjacent one side edge and indicating one quantity of liquid per land unit broadcast rate and specifying a precise time period for the operation of the liquid spray applicator and a second group of horizontal and longitudinal indicia adjacent the other side edge of said bag and indicating a separate quantity of liquid per land unit broadcast rate and specifying a separate precise time period for the operation of the liquid spray applicator; and
   (f) each of said indicia groups including a plurality of horizontal indicia marks indicating quantity of liquid dispensed and a plurality of longitudinal indicia lines indicating the speed of travel of the applicator vehicle.

2. A calibration device for determining the nozzle output of agricultural sprayers comprising:
   (a) an elongate, flexible, throw-away bag of translucent plastic sheet material having a thickness in the range of 2 to 5 mils;

(b) said bag having front and rear walls, opposite side edges and top and bottom portions, said walls being joined together at said bottom portion and along said side edges to provide an open interior cavity for receiving a quantity of liquid spray material dispensed from said nozzle;

(c) said top portion including spaced arm portions extending upwardly along said side edges and providing an opening in said front and rear walls between said spaced arm portions for fastening about a spray boom to conform to a shape of said boom and suspending said bag therefrom;

(d) said front wall having a plurality of indicia thereon to measure the quantity of liquid spray material dispensed into said bag and including horizontal indicia corresponding to a liquid quantity measurement and longitudinal indicia corresponding to the speed of travel of the applicator vehicle whereby a level of liquid quantity corresponds to a combined indicia disclosing a total quantity of liquid spray material as dispensed during a specified time period;

(e) said bag includes one group of horizontal and longitudinal indicia adjacent one side edge and indicating one quantity of liquid per land unit broadcast rate and specifying a precise time period for the operation of the liquid spray applicator and a second group of horizontal and longitudinal indicia adjacent the other side edge of said bag and indicating a separate quantity of liquid per land unit broadcast rate and specifying a separate precise time period for the operation of the liquid spray applicator; and (f) each of said indicia groups including a plurality of horizontal indicia marks indicating quantity of liquid dispensed and a plurality of longitudinal indicia lines indicating the speed of travel of the applicator vehicle.

* * * * *